United States Patent
Kim et al.

(10) Patent No.: US 8,723,977 B2
(45) Date of Patent: May 13, 2014

(54) IMAGE EDITING METHOD AND AN IMAGE EDITING APPARATUS USING THE SAME

(75) Inventors: In-ho Kim, Suwon-si (KR); Seong-hyun Kim, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 756 days.

(21) Appl. No.: 12/507,125

(22) Filed: Jul. 22, 2009

(65) Prior Publication Data
US 2010/0128139 A1 May 27, 2010

(30) Foreign Application Priority Data
Nov. 27, 2008 (KR) .................. 10-2008-0118741

(51) Int. Cl.
*H04N 5/235* (2006.01)
*H04N 5/76* (2006.01)
*H04N 5/225* (2006.01)

(52) U.S. Cl.
USPC .................. 348/222.1; 348/231.5; 348/220.1

(58) Field of Classification Search
USPC ........ 348/222.1, 333.05, 33.05, 220.1, 231.5, 348/231.99; 386/278; 715/723, 732
See application file for complete search history.

(56) References Cited

U.S. PATENT DOCUMENTS

| | | | | |
|---|---|---|---|---|
| 5,633,678 | A * | 5/1997 | Parulski et al. | 348/231.5 |
| 6,734,909 | B1 * | 5/2004 | Terane et al. | 348/333.05 |
| 6,747,674 | B1 * | 6/2004 | Asami | 715/721 |
| 7,830,570 | B2 * | 11/2010 | Morita et al. | 358/537 |
| 2003/0076435 | A1 * | 4/2003 | Sato | 348/333.11 |
| 2004/0179813 | A1 | 9/2004 | Kobayashi | |
| 2004/0240005 | A1 * | 12/2004 | Kim | 358/537 |

FOREIGN PATENT DOCUMENTS

| | | |
|---|---|---|
| JP | 2004280940 | 10/2004 |
| KR | 20020071494 | 9/2002 |

* cited by examiner

*Primary Examiner* — Ahmed A Berhan
(74) *Attorney, Agent, or Firm* — Stanzione & Kim, LLP

(57) ABSTRACT

An image editing method and an image editing apparatus include dividing an entire image, generating representative images, and generating edited images. Accordingly, a user may edit photographed images, recorded images or reproduced images more easily and conveniently.

30 Claims, 8 Drawing Sheets

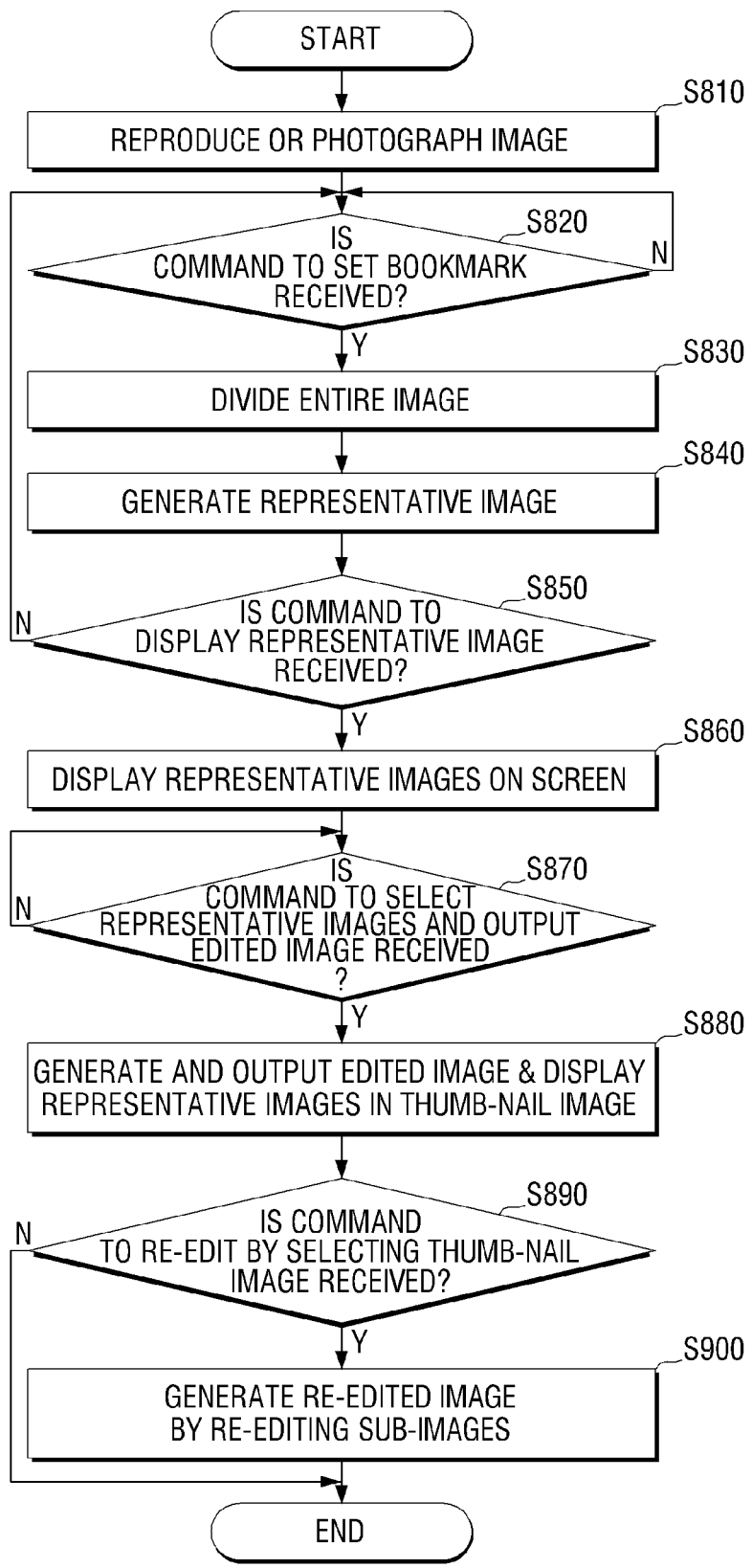

IMAGE EDITING METHOD AND AN IMAGE EDITING APPARATUS USING THE SAME

CROSS-REFERENCE TO RELATED APPLICATIONS

This application claims priority under 35 U.S.C. §119(a) from Korean Patent Application No. 2008-118741, filed on Nov. 27, 2008, in the Korean Intellectual Property Office, the contents of which are incorporated herein by reference in its entirety.

BACKGROUND

1. Field of the General Inventive Concept

The present general inventive concept relates to an image editing method and an image editing apparatus using the same, and more particularly, to an image editing method using a representative image and image editing apparatus thereof.

2. Description of the Related Art

As image capturing apparatuses such as digital cameras and camcorders are widely distributed and mobile communication terminals housing image capturing apparatuses are broadly used, users have become better able to photograph images more easily.

However, in order to edit photographed images, a user must go through a complicated process of editing using image apparatuses such as a television, a PDP, or a computer, or other image editing programs, making it difficult for a user to edit photographed images instantly using image capturing apparatuses.

Even when a user edits photographed images using image capturing apparatuses, editing functions are limited to providing simple digital effects such as brightness adjustment.

SUMMARY

The present general inventive concept provides an image editing method and an image editing apparatus to edit photographed images, recorded images, or images being reproduced easily and intuitively.

Additional aspects and utilities of the present general inventive concept will be set forth in part in the description which follows and, in part, will be obvious from the description, or may be learned by practice of the general inventive concept.

The image editing method according to an exemplary embodiment of the present general inventive concept includes dividing an entire image into a plurality of sub-images, generating a plurality of representative images representing the sub-images, and generating an edited image using sub-images that correspond to selected representative images from the plurality of representative images.

The edited image may be an image generated by integrating sub-images that correspond to the selected representative images.

The image editing method according to the exemplary embodiment of the present general inventive concept may further include producing the edited image by displaying the selected representative images as thumb-nail images when a command to produce the edited image is received.

In the operation of producing, time information on the representative images that correspond to the thumb-nail images is displayed in the vicinity of the thumb-nail images.

The image editing method according to the exemplary embodiment of the present general inventive concept may further include selecting at least one of the thumb-nail images and re-editing the edited image by editing sub-images on a sub-image basis.

The re-editing may include editing at least one of color, darkness, resolution, and reproduction speed.

In the operation of dividing, the entire image may be divided into a plurality of sub-images with reference to a point of time when a bookmark is set in the entire image.

The representative images may include at least one of a still image at the time of setting a bookmark and a still image corresponding to the first I-frame among the sub-images.

The bookmark may be set to correspond to a command by a user while the edited image is being produced or the entire image is being photographed, recorded, or being reproduced.

In the operation of generating the edited image, the edited image may be generated in a separate file from the entire image.

The entire image and sub-images may be moving images, and the representative images may be still images.

The foregoing and/or other aspects and utilities of the present general inventive concept may be achieved by providing a manipulation unit to receive a manipulation command, and a control unit to divide an entire image into a plurality of sub-images, generate a plurality of representative images representing the sub-images and generate an edited image using sub-images to correspond to selected representatives among the plurality of representative images.

The edited image may be an image generated by integrating sub-images that correspond to the selected representative images.

The control unit may display the selected representative images as thumb-nail images and produces the edited image when a command to produce the edited image is received.

The control unit may display time information of representative images that correspond to the thumb-nail images in the vicinity of the thumb-nail images.

The control unit may edit sub-images that correspond to selected thumb-nail images when a command is received to select the thumb-nail images and re-edit the edited image on a sub-image basis.

The re-editing may include editing at least one of color, darkness, resolution, and reproduction speed of sub-images corresponding to the selected thumb-nail images.

The image processing unit may divide the entire image into a plurality of sub-images with reference to a point of time when a bookmark is set.

The representative images may be at least one of still image at the time of setting a bookmark and a still image corresponding to the first I-frame among the sub-images.

The bookmark may be set corresponding to a command by a user while the edited image is being produced or the entire image is being photographed, recorded, or being reproduced.

The control unit may generate the edited image in a separate file from the entire image.

The entire image and sub-images may be moving images, and the representative images may be still images.

The foregoing and/or other aspects and utilities of the present general inventive concept may also be achieved by providing a computer readable medium to contain computer-readable codes as a program to perform an image editing method of a video apparatus including dividing an entire image into a plurality of sub-images, generating a plurality of representative images representing the sub-images, and generating an edited image using sub-images that correspond to selected representative images from the plurality of representative images.

The foregoing and/or other aspects and utilities of the present general inventive concept may also be achieved by providing a video apparatus including an image capturing unit to capture an entire image, and a control unit to divide the entire image into a plurality of sub-images, the control unit generating a plurality of representative images representing the sub-images and generating an edited image using sub-images that correspond to selected representative images from the plurality of representative images. The edited images may include at least a portion of the representative images and a characteristic.

The foregoing and/or other aspects and utilities of the present general inventive concept may also be achieved by providing an image capturing unit to capture an entire image, a manipulation unit to receive a manipulation command, and a control unit to divide the entire image into a plurality of sub-images, the control unit generating a plurality of representative images representing the sub-images and generating an edited image using sub-images that correspond to selected representative images from the plurality of representative images.

The foregoing and/or other aspects and utilities of the present general inventive concept may also be achieved by providing a method of editing images in a video apparatus including receiving a first command to set a bookmark and generating a first representative image to correspond to a first sub-image, receiving a second command to set a second bookmark and generating a second representative image to correspond to a second sub-image and a third representative image to correspond to a third sub-image, and displaying the first, second and third representative images on a screen and selecting all or a portion of the representative images to generate an edited image.

The foregoing and/or other aspects and utilities of the present general inventive concept may also be achieved by providing a method of editing images in a video apparatus including dividing an entire image into a plurality of sub-images, receiving a command to display a plurality of representative images on a screen representing the sub-images and displaying the representative images, selecting a portion of the representative images to represent an edited image, generating an edited image and displaying the selected representative images as thumb nail images on a lower portion of the screen, and selecting a thumb-nail image for re-editing.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which:

FIG. 8 is a flow chart illustrating an image editing method according to an embodiment of the present general inventive concept.

DETAILED DESCRIPTION OF THE EMBODIMENTS

Figure 1:
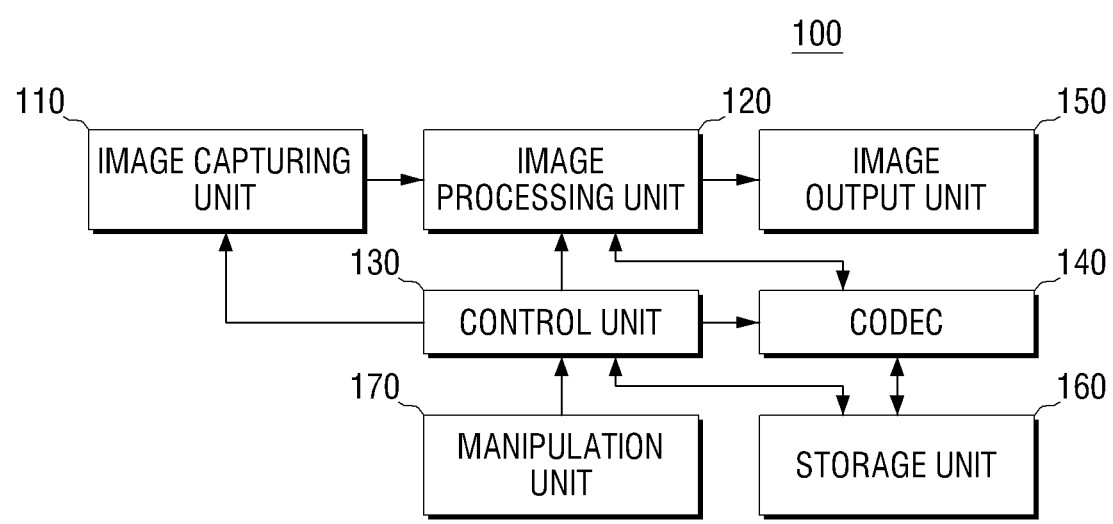
FIG. 1 is a block diagram illustrating a image capturing apparatus according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram illustrating an image capturing apparatus 100 according to an exemplary embodiment of the present general inventive concept. The image capturing apparatus 100 may be a photographing or video apparatus.

The image capturing apparatus 100 divides a photographed image, recorded image, or a reproduced image (referred to below as an 'entire image') into a plurality of sub-images, generates a plurality of representative images representing the sub-images, and edits the entire image using selected representative images among the plurality of representative images.

A reproduced image may be an image or images reproduced from a memory unit installed in or connected to the image capturing unit 110 of the apparatus 100. Reproduced images may be still or moving images. When displaying or reproducing an image, a user may photograph one or more still images or may record one or more moving images before the image or images are divided into sub-images.

The image capturing apparatus 100 includes a image capturing unit 110, an image processing unit 120, a control unit 130, a codec 140, an image output unit 150, a storage unit 160, and a manipulation unit 170.

The image capturing unit 110 may transform signals of incident light received through a lens (not illustrated) into electrical signals and may perform predetermined processing on the electric signals.

Accordingly, the image capturing unit 110 may include an image sensor (not illustrated) to output image signals in analog format and an analog-digital converter (AD converter) (not illustrated) to convert image signals in analog format into image signals in digital format.

The image processing unit 120 may perform signal processing on image signals received from the image capturing unit 110, such as format conversion, digital-zoom to adjust image scale, auto white balance (AWB), auto focus (AF), or auto exposure (AE), and may send the processed signal to the image output unit 150 which will be explained later.

The image processing unit 120 may transmit the processed image signals to the codec 140 in order to store photographed or recorded images.

The codec 140 performs encoding to store photographed or recorded images and performs decoding to display stored images. The codec 140 encodes image signals received from the image processing unit 120 and transmits the encoded image signal to the storage unit 160, and the codec 140 may further decode encoded image signals stored in the storage unit 160 and transmit the decoded image signals to the image processing unit 120.

The image output unit 150 outputs image signals received from the image processing unit 120 to an internal display apparatus or an external output terminal. The signals may be output to form still images or moving images. The internal display apparatus and the external output terminal may be installed on a housing of the image capturing apparatus 100 or may be connected to the image capturing apparatus 100 through a wired or wireless communication unit. The internal display apparatus and the external output terminal may include a screen to display images received from the image output unit 150.

The storage unit 160 may store images photographed or recorded by the image capturing unit 110 in a contracted format, and may store program information and setting information necessary to control the system of the image capturing apparatus 100. The storage unit 160 may store data, images, program information, setting information, or other information via flash memory, hard-disk, DVD, or other storage methods and apparatuses as are known in the art.

The manipulation unit 170 receives a command by a user and transmits the command to the control unit 130 which will be explained later. The control unit 130 controls overall operation of the image capturing apparatus 100 corresponding to manipulation commands input by the user.

More specifically, the control unit 130 controls the image capturing unit 110 and the image processing unit 120 so as to electrically transform light signals into electric signals and to perform predetermined processing on the electric signals, and controls the codec 140 so as to encode processed image signals and/or to decode encoded images.

The control unit 130 also controls the storage unit 160 to store generated representative images or edited images corresponding to a command by a user input via the manipulation unit 170 and to extract and display stored representative images and edited images. The explanation regarding representative images and edited images will be provided later.

The control unit 130 may also divide an entire image into sub-images as a result of a command by a user input via the manipulation unit 170. More specifically, if a user inputs a command to set a bookmark while an image is being photographed, recorded, or reproduced, the control unit 130 may divide the entire image into sub-images with reference to the timing or the number of times when a command is received to set a bookmark. A bookmark may divide the entire image into images that precede the setting of one or more bookmarks and the image that comes after the final bookmark is set. For instance, if a command to set a bookmark is received three times while an entire image is being photographed, recorded or reproduced, the entire image is divided into four sub-images. Thus, if a command to set a bookmark is received N times for an entire image, then the entire image may be divided into N+1 sub-images, wherein N is a positive integer greater than 0. However, the present general inventive concept is not limited thereto. The number of bookmarks is not limited to N+1 and may be increased to N+2, N+3, etc. or decreased according to a user preference or a predetermined process within the image capturing apparatus 100.

The control unit 130 may generate a plurality of representative images representing the sub-images. That is, if four sub-images have been generated, the control unit 130 generates four representative images representing four sub-images. The entire image and sub-images may be moving or still images and the representative images may be still images.

The control unit may also control the image processing unit 120 to perform the above described dividing of the entire image, generating the representative images, and editing the images.

Figure 2:
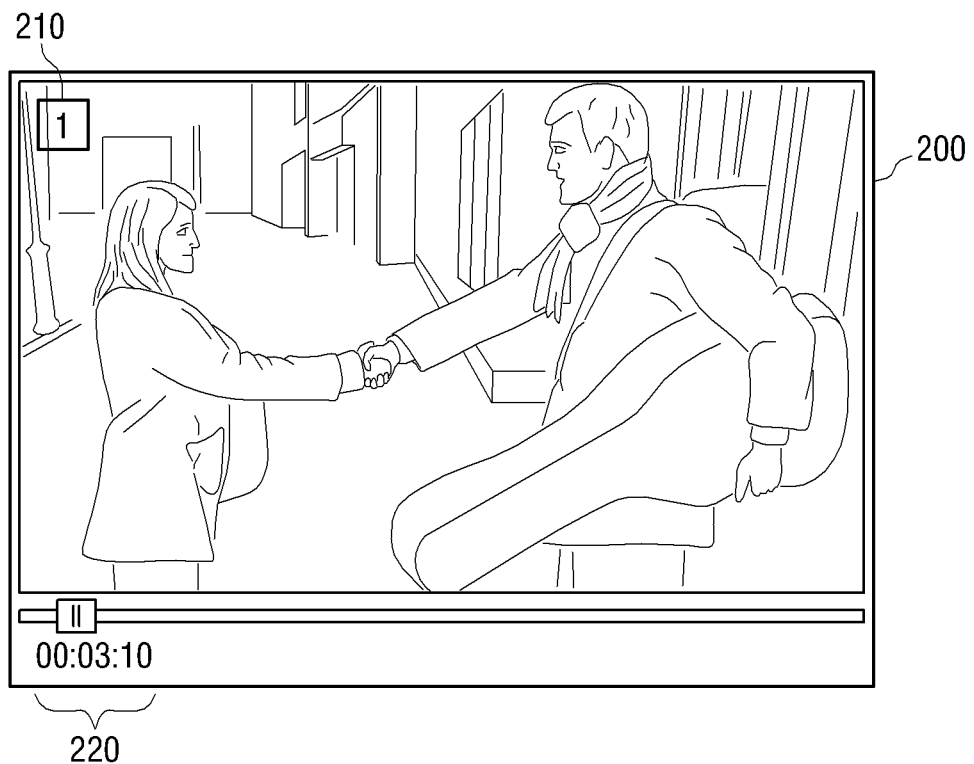
FIG. 2 is a schematic view illustrating a representative image representing sub-images according to an embodiment of the present general inventive concept.

This feature will be explained with reference to FIG. 2. FIG. 2 is a schematic view illustrating one of a plurality of representative images representing sub-images.

In operation, the entire image being reproduced, recorded, or photographed is displayed on a screen 200. A progress bar 220 indicates that is has been 0 hr. 3 min. and 10 sec. since the image started to be reproduced, recorded, or photographed. It can be seen that it is at 0 hr. 3 min. and 10 sec. when a command to set a bookmark is received. In addition, information regarding the number of commands to set a bookmark 210 is also displayed on the screen.

A command to set a bookmark may be displayed as a square box in a portion of a screen, such as in the upper left hand corner of a representative image or may be located near any of the other three corners of the screen, or placed anywhere else in the screen 200 depending on a user's preference. The shape of the bookmark display is not limited to being a square box. The shape of the figure surrounding the bookmark number may be triangular, circular, or other geometric shape, or the bookmark number may be displayed without being surrounded by a box or other shape. Also, the bookmark number and box may be displayed in a variety of colors in order to enhance their visibility to a user.

A representative image is a still image representing each sub-image, and may be a still image at the time of receiving a control command to set a bookmark or a still image corresponding to a first intraframe, or I-frame, after a command to set a bookmark is received.

For example, if one bookmark is set at 0 hr. 3 min. 10 sec., the entire image is divided into two sub-images with reference to 0 hr. 3 min. 10 sec., and the representative image is a still image at 0 hr. 3 min. 10 sec., or a still image corresponding to the first I-frame after 0 hr. 3 min. 10 sec.

If a second command to set a bookmark is received at 0 hr. 5 min. 20 sec., the image to be displayed in FIG. 2 would be a second representative image representing sub-images from 0 hr. 3 min. 10 sec. to 0 hr. 5 min. 19 sec. The second representative image would be a still image at 0 hr. 5 min. 19 sec. or a still image corresponding to the first I-frame after 0 hr. 5 min. 19 sec.

The control unit 130 illustrated in FIG. 1 generates representative images representing sub-images.

The control unit 130 may display all of the representative images generated according to commands by a user input via the manipulation unit 170 on the screen 200. A user may select part of the representative images and generate an edited image using the selected representative images. This will be explained with reference to FIGS. 3 to 5.

Figure 3:
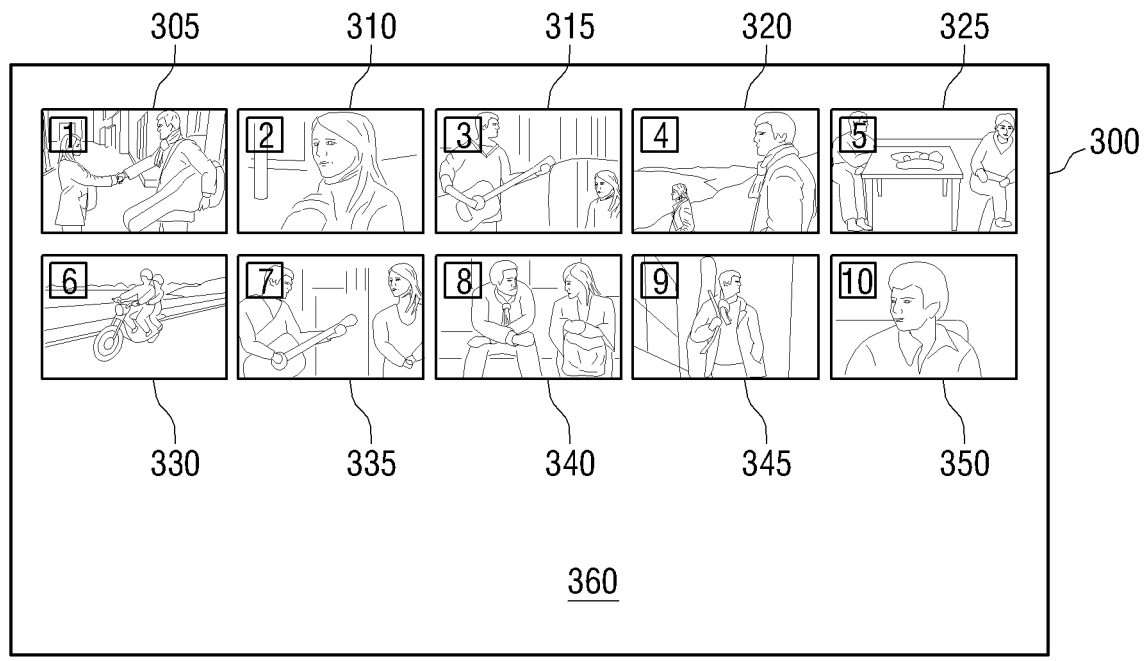
FIG. 3 is a schematic view illustrating a screen displaying representative images.

FIG. 3 is a schematic view illustrating a screen 300 displaying 10 representative images 305 to 350. The screen 300 may be a screen on a digital camera, camcorder, television screen, personal computer, laptop, PDA, mobile phone, or other similar device. Representative images 305 to 350 are displayed on the screen 300 so that a user can select representative images via the manipulation unit 170. Since a total of 10 representative images are being displayed on the screen 300, a user can recognize that there are a total of 10 bookmarks that have been set for this set of representative images.

The number of representative images is not limited to ten. FIG. 3 includes a blank space 360 in which more representative images may be formed if additional bookmarks are selected for the photographed, recorded, or reproduced images. The sizes of the representative images may be varied to fit more or less representative images on the screen 300. For example, a user could enlarge the size of the representative images for higher resolution, or lessen the size to fit more representative images on a screen. Also, additional screens may be used to display more images if required in which a user may scroll through desired pages of representative images.

Figure 4:
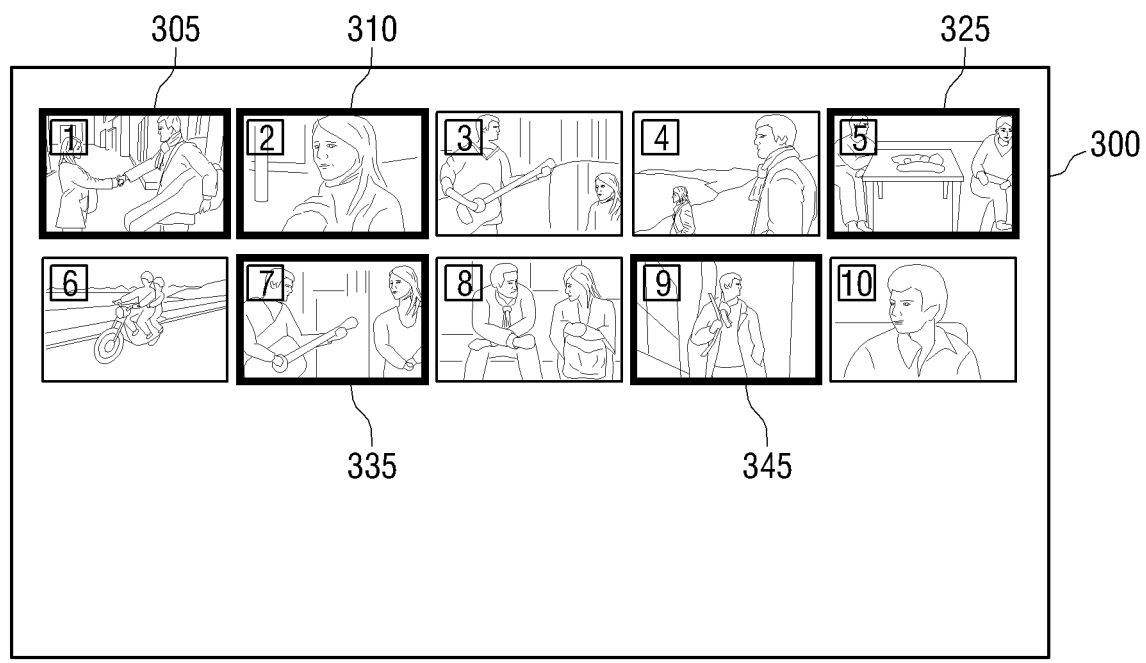
FIG. 4 is a schematic view illustrating a process of selecting images among a plurality of representative images corresponding to a command to select representative images input via the manipulation unit according to an embodiment of the present general inventive concept.

FIG. 4 is a schematic view illustrating a process of selecting images among a plurality of representative images corresponding to a command to select representative images input by a manipulation unit 170. Since 5 representative images 305, 310, 325, 335 and 345 with bookmark numbers 1, 2, 5, 7 and 9 among a total of 10 representative images are highlighted on the screen 300, it can be seen that the user has selected a total of 5 images. As such, a user may select images among representative images and generate an edited image using sub-images corresponding to the selected representative images.

The control unit 130 may highlight the selected representative images by forming a bolded border around each selected representative image to signify to the user which representative images have been chosen. The five representative images are an exemplary number. More or less images may be selected to produce the edited image. The representative images may be selected and unselected using a mouse pointer, keyboard, touch screen, or using other devices and methods as are known in the art.

Figure 5:
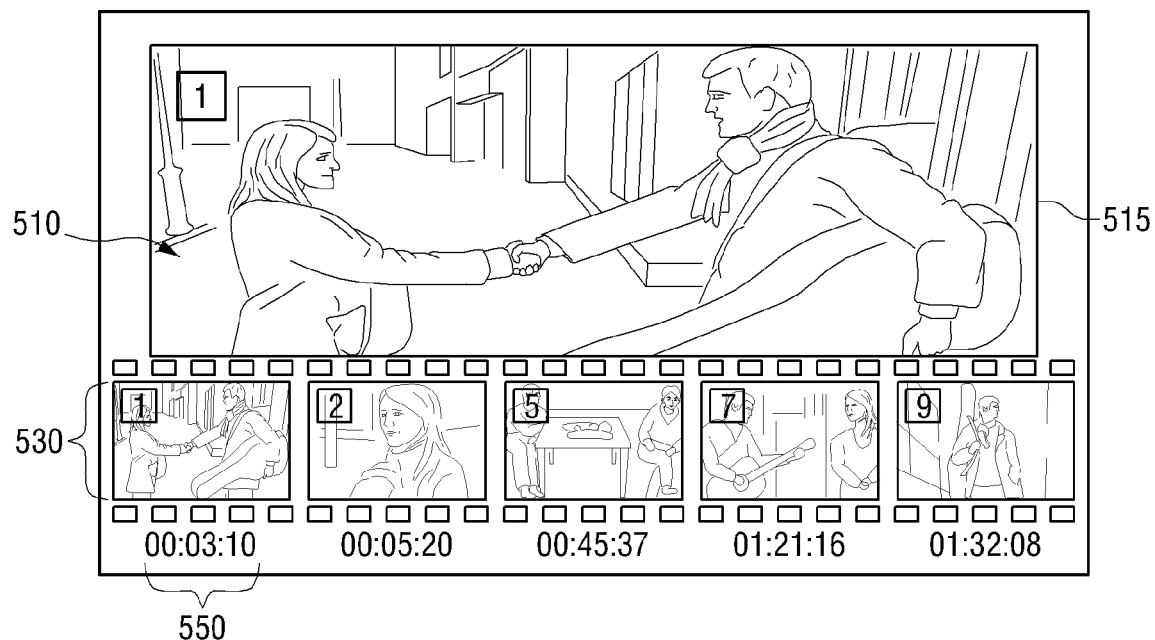
FIG. 5 is a schematic view illustrating edited images generated after representative images are selected according to an embodiment of the present general inventive concept.

FIG. 5 is a schematic view illustrating edited images generated after representative images are selected.

After representative images 305, 310, 325, 335 and 345 are generated based on bookmarks 1, 2, 5, 7 and 9 of the representative images that are set while an entire image is being photographed, recorded, or reproduced, a user may generate an edited image by selecting some images among generated representative images.

The edited image may be an image formed from at least a portion of an original image (one or more selected representative images) and at least a characteristic added to the original image or at least a characteristic to replace a portion of the image. The characteristic may be a line, dot, area or another image. The image may be enlarged or reduced either horizontally or vertically. The edited image may be generated by integrating sub-images corresponding to the selected representative images. That is, the edited image is an edited image consisted of sub-images corresponding to the selected representative images out of the entire image. The generating of the edited image may be characterized by generating the edited image in a separate file from the entire image.

If a command to produce an edited image is input through input unit 170 and received by the image capturing apparatus 100, the control unit 130 may produce the edited image by displaying the edited image of the selected representative images that are displayed as thumb-nail images, as illustrated in the lower part of the screen 300.

Accordingly, the edited image 510 is produced on the editing screen 515 and the selected representative images are displayed in the thumb-nail image section 530 at the lower part of the edited image. In addition, the time information 550 regarding the representative images corresponding to the thumb-nail images is also displayed at the lower part of the thumb-nail images. Thus, a user may produce an edited image while at the same time checking and comparing the set timing of bookmarks that correspond to representative images that are included in the edited image.

However, displaying representative images in a thumb-nail image section 530 while displaying an edited image 510 is merely an exemplary embodiment of the present general inventive concept. A user may decide whether or not to display representative images in a thumb-nail image at the lower part of an edited image while the edited image is being produced.

Referring to FIGS. 1 and 5, the control unit 130 may generate the editing screen 515 using selected representative images as explained above.

A user may then edit sub-images included in an edited image while producing the edited image. This will be explained with reference to FIG. 6 and FIG. 7.

Figure 6:
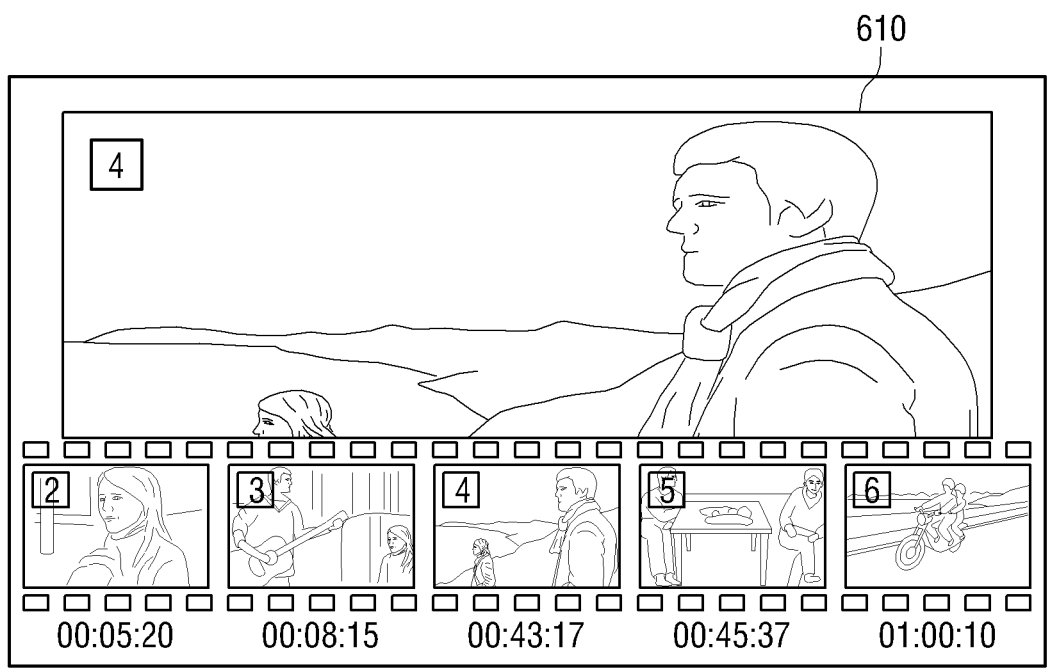
FIG. 6 is a schematic view illustrating an editing process in which edited images are re-edited by editing sub-images according to an embodiment of the present general inventive concept.
Figure 7:
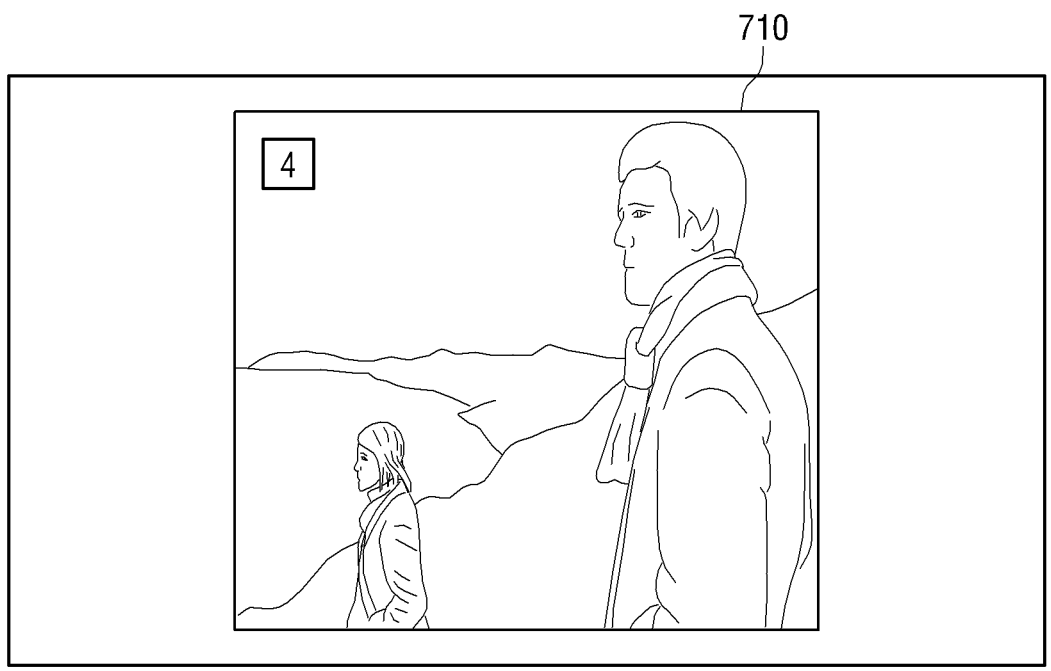
FIG. 7 is a schematic view illustrating part of the re-edited images according to an embodiment of the present general inventive concept.

FIG. 6 is a schematic view illustrating an editing process in which edited images are re-edited on a sub-image basis by editing sub-images, and FIG. 7 is a schematic view illustrating part of the re-edited images.

As illustrated in FIG. 6, if a user selects some thumb-nail images via the manipulation unit 170 and inputs a command to perform digital effect processing, for example, on the selected thumb-nail images, the control unit 130 performs the digital effect processing on the sub-images corresponding to the selected thumb-nail images. Accordingly, an edited image can be re-edited by simply selecting thumb-nail images.

For instance, as illustrated in FIG. 6, if a user selects the fourth thumb-nail image, and inputs a command to perform an editing function of 'contraction scaling' on the fourth thumb-nail image, the control unit 130 performs 'contraction scaling' not only on the representative image corresponding to the thumb-nail image but also on the sub-image represented by the representative image corresponding to the fourth thumb-nail image to produce a re-edited image 610. Accordingly, 'contraction scaling' is performed on sub-image between 0 hr. 43 min. 17 sec. to 0 hr. 45 min. 36 sec.

FIG. 7 illustrates an additional exemplary scaling operation that may be performed on the fourth thumbnail image. As is illustrated in FIG. 7, the edited image 710 may be increased in height and decreased in width to emphasize different portions of an image or scene. Also, when displaying the edited image for re-editing, the thumbnail section 530 may or may not be displayed to present a fuller view of a desired image to be edited.

However, performing 'contraction scaling' and other scaling are merely examples of re-editing, and there are other forms of re-editing such as changing color, darkness, resolution, reproduction speed, or rotating a sub-image, in which editing a sub-image ultimately leads to changing an edited image.

As described above, a process of selecting representative images and generating an edited image using sub-images corresponding to the selected representative images, and a process of selecting representative images from an edited image and re-editing the entire image by editing sub-images corresponding to the selected representative images are explained.

A process of generating a plurality of representative images representing sub-images corresponding to a bookmarked entire image, and a process of selecting representative images in a thumbnail section from an edited image and generating sub-images corresponding to the selected representative images will be reviewed and explained with reference to FIGS. 2 to 6.

As illustrated in FIG. 2, a user may generate a plurality of representative images by inputting a command to set a bookmark while an entire image is being photographed, recorded, or reproduced. As illustrated in FIG. 3, if a user generates a total of 10 representative images, the user may select and generate part of the representative images.

As illustrated in FIG. 4, if a user selects Nos. 1, 2, 5, 7, and 9 images among the representative images, an edited image consisting of sub-images corresponding to the representative images of Nos. 1, 2, 5, 7, and 9 is produced on the screen as illustrated in FIG. 5.

Accordingly, a user may view the sub-images that a user wishes to view by selecting the representative images.

In addition, after an edited image is generated using sub-images corresponding to the selected representative images, a user may reproduce only part of the sub-images included in the edited image. For instance, if a user selects 5 representative images and generates an edited image consisted of 5 still images corresponding to the 5 representative images, the user may select fewer than the 5 representative images and reproduce the still images corresponding to the fewer selected representative images.

Accordingly, a user may view the sub-images that a user wishes to view by selecting the representative images.

FIG. 8 is a flow chart illustrating an image editing method according to an exemplary embodiment of the present general inventive concept.

The control unit 130 determines whether a command to set a bookmark is received (operation S820) via the manipulation unit 170 while an image is being reproduced, recorded, or photographed (operation S810).

If it is determined that a command to set a bookmark is received (operation S820-Y), the control unit (130) divides the entire image which is photographed, recorded, or reproduced with reference to the time at which the command to set the bookmark is received operation (S830).

The control unit 130 generates the still images at the time of receiving one or a plurality of commands to set bookmarks or a still image corresponding to the first intraframe, or I-frame, after the commands to set the bookmarks are received as the representative images of the divided sub-image (operation S840).

The control unit 130 determines whether a command to display the representative image is received (operation S850). If it is determined that the command to display the representative images is not received (operation S850-N), the control unit 130 repeats operations S820 to S840, dividing the entire image and generating sub-images and representative images repeatedly.

If it is determined that the command to display the one or a plurality of representative image is received (operation S850-Y), the control unit 130 displays all of the generated representative images on the screen (operation S860).

The control unit determines whether part of the representative images among representative images displayed on the screen is selected, highlights the selected representative images, and determines whether a command to output an edited image is received (operation S870), or not received (operation S870-N).

If it is determined that the command to output the edited image is received (operation S870-Y), the control unit 130 generates and outputs the edited image and displays the selected representative images in thumb-nail image format at the lower part of the edited image (operation S880).

The control unit 130 determines whether a thumb-nail image is selected and whether a command to perform re-editing is received (operation S890).

If it is determined that the command to perform re-editing is received (operation S890-Y), the control unit 130 edits the sub-images corresponding to the selected thumb-nail image and generates the re-edited image (operation S900). If it is determined that the command to perform re-editing is not received (S890-N), re-editing is not performed.

Accordingly, using the present general inventive concept, a user can edit photographed, recorded, or reproduced images more conveniently and intuitively.

In the above description, the process of re-editing an edited image by editing a single sub-image has been explained. However, a plurality of sub-images can be selected and edited such that a plurality of edited images can be re-edited.

The manipulation unit 170 may receive a user's command to divide an entire image into sub-images, generate representative images, and generate an edited still or moving image or to set one or a plurality of thumb-nails in the above description. However, this is merely an example for better explanation. If the image capturing apparatus 100 is implemented as a touch screen, a user can touch the representative images on the screen to generate an edited image.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, DVDs, magnetic tapes, floppy disks, and optical data storage devices. The computer-readable recording medium can also be distributed over network coupled computer systems so that the computer-readable code is stored and executed in a distributed fashion. The computer-readable transmission medium can be transmitted through carrier waves or signals (e.g., wired or wireless data transmission through the Internet). Also, functional programs, codes, and code segments to accomplish the present general inventive concept can be easily construed by programmers skilled in the art to which the present general inventive concept pertains.

The method of generating an edited image in the image capturing apparatus 100 has been explained in the above description. However, this method is applicable to any apparatus capable of reproducing images, even if the apparatus is incapable of capturing still or moving images. Accordingly, a user can edit displayed images, photographed images, recorded images, or reproduced images more conveniently and intuitively.

Although a few embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. An image editing method of a video apparatus, comprising:
    setting a plurality of bookmarks at variable time measurements to mark time segments of an entire image in response to input commands from a user;
    dividing the entire image into a plurality of sub-images based on the variable time set bookmarks;
    generating a plurality of representative images representing the sub-images; and
    generating an edited image using sub-images that correspond to selected representative images from the plurality of representative images,
    wherein a plurality of playback sections or a plurality of photographing sections corresponding to the plurality of bookmarks include a different time period from each other.

2. The image editing method of claim 1, wherein the edited image is an image generated by integrating sub-images that correspond to the selected representative images.

3. The image editing method of claim 1, further comprising:
producing the edited image by displaying the selected representative images as thumb-nail images when a command to produce the edited image is received.

4. The image editing method of claim 3, wherein the producing is characterized by displaying time information of the representative images that correspond to the thumb-nail images in the vicinity of the thumb-nail images.

5. The image editing method of claim 3, further comprising:
selecting at least one of the thumb-nail images and re-editing the edited image on a sub-image basis.

6. The image editing method of claim 5, wherein the re-editing includes editing at least one of color, darkness, resolution, and reproduction speed.

7. The image editing method of claim 1, wherein the dividing is characterized by dividing the entire image into a plurality of sub-images with reference to a point of time when is the bookmarks are set in the entire image.

8. The image editing method of claim 7, wherein the representative images include at least one of a still image at the time of setting the bookmarks and a still image corresponding to the first I-frame among the sub-images.

9. The image editing method of claim 7, wherein the bookmarks are set to correspond to commands by a user while the edited image is being produced or the entire image is being photographed, recorded or being reproduced.

10. The image editing method of claim 1, wherein the generating of the edited image is characterized by generating the edited image in a separate file from the entire image.

11. The image editing method of claim 1, wherein the entire image and sub-images are moving images, and the representative images are still images.

12. A video apparatus, comprising:
a manipulation unit to receive manipulation commands from a user to set a plurality of bookmarks at variable time measurements to mark time segments of an entire image in response to the manipulation commands; and
a control unit to divide the entire image into a plurality of sub-images based on the variable time set bookmarks, generate a plurality of representative images representing the sub-images and generate an edited image using sub-images to correspond to selected representatives among the plurality of representative images according to the manipulation command,
wherein a plurality of playback sections or a plurality of photographing sections corresponding to the plurality of bookmarks include a different time period from each other.

13. The video apparatus of claim 12, wherein the edited image is an image generated by integrating sub-images that correspond to the selected representative images.

14. The video apparatus of claim 12, wherein the control unit displays the selected representative images as thumb-nail images and produces the edited image when a command to produce the edited image is received.

15. The video apparatus of claim 14, wherein the control unit displays time information of the representative images that correspond to the thumb-nail images in the vicinity of the thumb-nail images.

16. The video apparatus of claim 14, wherein the control unit edits sub-images that corresponds to selected thumb-nail images when a command is received to select the thumb-nail images and re-edit the edited image on a sub-image basis.

17. The video apparatus of claim 16, wherein the re-editing includes editing at least one of color, darkness, resolution, and reproduction speed of sub-images corresponding to the selected thumb-nail images.

18. The video apparatus of claim 12, wherein the control unit divides the entire image into a plurality of sub-images with reference to a point of time when the bookmarks are set in the entire image.

19. The video apparatus of claim 18, wherein the representative images include at least one of a still image at the time of setting the bookmarks and a still image corresponding to the first I-frame among the sub-images.

20. The video apparatus of claim 18, wherein the bookmarks are set corresponding to a command by a user while the edited image is being produced or the entire image is being photographed, recorded or being reproduced.

21. The video apparatus of claim 12, wherein the control unit generates the edited image in a separate file from the entire image.

22. The video apparatus of claim 12, the entire image and sub-images are moving images, and the representative images are still images.

23. A non-transitory computer readable medium to contain computer-readable codes as a program to perform an image editing method of a video apparatus, the method comprising:
setting a plurality of bookmarks at variable time measurements to mark time segments of an entire image in response to input commands from a user;
dividing the entire image into a plurality of sub-images based on the variable time set bookmarks;
generating a plurality of representative images representing the sub-images; and
generating an edited image using sub-images that correspond to selected representative images from the plurality of representative images,
wherein a plurality of playback sections or a plurality of photographing sections corresponding to the plurality of bookmarks include a different time period from each other.

24. A video apparatus, comprising:
an image capturing unit to capture an entire image;
a manipulation unit to receive manipulation commands from a user at variable time measurements to mark time segments of the entire image; and
a control unit to divide the entire image into a plurality of sub-images based on the variable time measurements, the control unit generating a plurality of representative images representing the sub-images and generating an edited image using sub-images that correspond to selected representative images from the plurality of representative images,
wherein a plurality of playback sections or a plurality of photographing sections corresponding to a plurality of bookmarks include a different time period from each other, the plurality of bookmarks being set at variable time measurements to mark the time segments according to the manipulation commands received by the manipulation unit.

25. the video apparatus of claim 24, wherein the edited images comprise at least a portion of the representative images and characteristic.

26. A video apparatus, comprising:
an image capturing unit to capture an entire image;

a manipulation unit to receive manipulation commands from a user at variable time measurements to mark time segments of an entire image; and a control unit to divide the entire image into a plurality of sub-images based on the variable time measurements, the control unit generating a plurality of representative images representing the sub-images and generating an edited image using sub-images that correspond to selected representative images from the plurality of representative images according to the manipulation command, wherein a plurality of playback sections or a plurality of photographing sections corresponding to a plurality of bookmarks include a different time period from each other, the plurality of bookmarks being set at the variable time measurements to mark the time segments according to the manipulation commands received by the manipulation unit.

27. A method of editing images in a video apparatus, the method comprising:

receiving a first command from a user at a first time point to set a bookmark in an entire image and establish a first time interval from a beginning of an entire image to the first time point and generating a first representative image to correspond to a first sub-image;

receiving a second command from a user at a second time point to set a second bookmark at a time interval different from the first time interval and generating a second representative image to correspond to a second sub-image and a third representative image to correspond to a third sub-image; and displaying the first, second and third representative images on a screen and selecting all or a portion of the representative images to generate an edited image, wherein a plurality of playback sections or a plurality of photographing sections corresponding to the first bookmark or second bookmark include a different time period from each other.

28. The method of claim 27, further comprising:

receiving a third command from a user at a third time point to set a third bookmark at a third time interval different than the first and second time intervals and generating the third representative image to correspond to a third sub-image.

29. A method of editing images in a video apparatus, the method comprising:

dividing an entire image into a plurality of sub-images in response to commands received from a user at different time intervals;

receiving a command to display a plurality of representative images on a screen representing the sub-images and displaying the representative images;

selecting a portion of the representative images to represent an edited image;

generating an edited image and displaying the selected representative images as thumb nail images on a lower portion of the screen; and selecting a thumb-nail image for re-editing, wherein a plurality of playback sections or a plurality of photographing sections corresponding to a plurality of bookmarks include a different time period from each other, the plurality of bookmarks being set according to the commands received from the user at different time intervals.

30. A touchscreen apparatus, comprising:

a manipulation unit to receive manipulation commands from a touch screen to set a plurality of bookmarks at variable time measurements to mark time segments of an entire image in response to the manipulation commands;

a control unit to divide the entire image into a plurality of sub-images based on the variable time set bookmarks, generate a plurality of representative images representing the sub-images and generate an edited image using sub-images to correspond to selected representatives among the plurality of representative images according to the manipulation command; and a display unit to display the generated plurality of representative images and the edited image, wherein a plurality of playback sections or a plurality of photographing sections corresponding to the variable time set bookmarks include a different time period from each other.

* * * * *